United States Patent
Honda

(10) Patent No.: US 11,468,037 B2
(45) Date of Patent: Oct. 11, 2022

(54) MEMORY DEVICE AND DATA VERIFICATION METHOD

(71) Applicant: SEMICONDUCTOR COMPONENTS INDUSTRIES, LLC, Phoenix, AZ (US)

(72) Inventor: Iwao Honda, Oizumi-machi (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 550 days.

(21) Appl. No.: 16/451,244

(22) Filed: Jun. 25, 2019

(65) Prior Publication Data

US 2020/0285628 A1 Sep. 10, 2020

Related U.S. Application Data

(60) Provisional application No. 62/814,329, filed on Mar. 6, 2019.

(51) Int. Cl.
*G06F 16/23* (2019.01)
*G06F 11/10* (2006.01)

(52) U.S. Cl.
CPC ...... *G06F 16/2365* (2019.01); *G06F 11/1004* (2013.01)

(58) Field of Classification Search
None
See application file for complete search history.

(56) References Cited

U.S. PATENT DOCUMENTS

| 9,639,416 | B1 * | 5/2017 | Parlour | G06F 11/1004 |
| 9,703,727 | B2 * | 7/2017 | Chapier | G06F 21/79 |
| 2002/0040423 | A1 | 4/2002 | Okaue et al. | |
| 2002/0069315 | A1 | 6/2002 | Okaue | |
| 2006/0015753 | A1 * | 1/2006 | Drehmel | H04L 9/32 713/193 |
| 2006/0184804 | A1 * | 8/2006 | Varma | G06F 12/0897 713/193 |
| 2008/0130869 | A1 | 6/2008 | Akkar et al. | |
| 2008/0189498 | A1 * | 8/2008 | Brown | G06F 11/1004 711/162 |

(Continued)

FOREIGN PATENT DOCUMENTS

TW 201805942 A * 2/2018 ......... G06F 12/0246

*Primary Examiner* — Eddy Cheung
(74) *Attorney, Agent, or Firm* — Rennie William Dover

(57) ABSTRACT

A method for verifying data in a memory device and a circuit. Data from a microcontroller unit or a data storage structure is copied to a register block. A checksum value and a checksum seed value are determined from the data copied to the register block. These values may be determined using a cyclic redundancy check technique. A verification value is determined using the checksum seed value and the checksum value, which verification value is used to verify the integrity of the data in the memory device. In accordance with another aspect the motor driver circuit includes a memory device configured to have a reserved data section, a non-reserved data section, and a checksum storage section. A register block is coupled to the memory device where the register block includes a checksum seed storage register; and a check function circuit is coupled to the storage register.

20 Claims, 10 Drawing Sheets

(56) References Cited

U.S. PATENT DOCUMENTS

| | | | |
|---|---|---|---|
| 2010/0192050 A1* | 7/2010 | Burbridge | H03M 13/093 |
| | | | 714/807 |
| 2013/0111308 A1* | 5/2013 | Sauber | G06F 11/1004 |
| | | | 714/807 |
| 2013/0191614 A1* | 7/2013 | King | G06F 9/30032 |
| | | | 712/200 |
| 2017/0091020 A1* | 3/2017 | Rat | G06F 11/1435 |

* cited by examiner

| BYTE # | OTP DATA (hex) | | CRC (hex) CALCULATION |
|---|---|---|---|
| | | | 00 |
| 0 | 00 | 90 | 00 |
| 1 | 00 | 91 | 00 |
| 2 | 00 | 92 | 00 |
| 3 | 00 | 93 | 00 |
| 4 | 00 | 94 | 00 |
| 5 | 00 | 95 | 00 |
| 6 | 00 | 96 | 00 |
| 7 | 00 | 97 | 00 |
| 8 | 00 | 98 | 00 |
| 9 | 00 | 99 | 00 |
| 10 | 00 | 100 | 00 |

| BYTE # | OTP DATA (hex) | | CRC (hex) CALCULATION |
|---|---|---|---|
| | | | 00 —88 |
| 0 | 11 | 90 | E4 |
| 1 | 22 | 91 | A1 |
| 2 | 33 | 92 | 4F |
| 3 | 44 | 93 | 25 —89 |
| 4 | 00 | 94 | 2B |
| 5 | 00 | 95 | 3A |
| 6 | 00 | 96 | DE |
| 7 | 00 | 97 | FA |
| 8 | 00 | 98 | 9C |
| 9 | 00 | 99 | 5E |
| 10 | 00 | 100 | 86 —87 |

| BYTE # | OTP DATA (hex) | | CRC (hex) CALCULATION |
|---|---|---|---|
| | | | 00 |
| 0 | 11 | _90_ | E4 |
| 1 | 22 | _91_ | A1 |
| 2 | 33 | _92_ | 4F |
| 3 | 44 | _93_ | 25 |
| 4 | 55 | _94_ | 88 |
| 5 | 66 | _95_ | 4C |
| 6 | 77 | _96_ | 93 |
| 7 | 88 | _97_ | 8C |
| 8 | 99 | _98_ | 9D |
| 9 | AB | _99_ | 55 |
| 10 | 55 | _100_ | 00 |

| BYTE # | OTP DATA (hex) | | CRC (hex) CALCULATION |
|---|---|---|---|
| | | | 00 |
| 0 | 11 | 90 | E4 |
| 1 | 22 | 91 | A1 |
| 2 | 33 | 92 | 4F |
| 3 | 44 | 93 | 25 |
| 4 | 55 | 94 | 88 |
| 5 | 66 | 95 | 4C |
| 6 | 7B | 96 | 18 |
| 7 | 88 | 97 | D5 |
| 8 | 99 | 98 | B5 |
| 9 | AB | 99 | B8 |
| 10 | 55 | 100 | 9B |

MEMORY DEVICE AND DATA VERIFICATION METHOD

CROSS-REFERENCE TO RELATED APPLICATIONS

The present application is a Non-provisional patent application of U.S. Provisional Patent Application No. 62/814,329 filed on Mar. 6, 2019, by Iwao Honda, titled "MEMORY DEVICE AND DATA VERIFICATION METHOD", which is hereby incorporated by reference in its entirety, and priority thereto for common subject matter is hereby claimed.

TECHNICAL FIELD

The present invention relates, in general, to semiconductor components and, more particularly, to semiconductor components that include memory devices.

BACKGROUND

Memory devices are used in a wide variety of consumer and industrial products including automobiles, kitchen appliances, computational devices, security systems, communications devices, video games, audio and video devices, etc. The memory devices may be used to store data used in control applications such as, for example, motor control or they may be used to store data used in computational analysis. It is important to insure the integrity of the data stored in memory devices because data that has become corrupted can cause catastrophic failures in the particular application for which the data is being used. In motor control applications, corrupted data stored in a memory device may cause large current draws that may result in failure of the motor.

In automotive environments, electric motors are used for several different applications including radiator fans, fuel pumps, water pumps, and oil pumps. In these environments it is important to provide several protection mechanisms to protect against fault conditions that could lead to safety hazards. However it has been especially difficult to design a single IC motor controller that is useful for most or all of these different applications.

Semiconductor device manufacturers and their customers have developed techniques for guarding against failures caused by data corruption. However, these techniques have increased the area consumed by the memory devices and the error checking structures associated with the memory devices.

Accordingly, it would be advantageous to have a method and structure for verifying the integrity of the data stored in memory devices. It would be of further advantage for the method and structure to be cost efficient and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 3 is a representation of a data storage location and intermediate value storage location used for checking the integrity of data in accordance with embodiments of the present invention;

FIG. 5 is a representation of the data storage location, data stored in the data storage location, and intermediate values stored in the intermediate value storage location and used for checking the data integrity;

FIG. 7 is a representation of the data storage location, data stored in the data storage location, and intermediate values stored in the intermediate value storage location and used for checking the integrity of the data in accordance with an embodiment of the present invention;

FIG. 8 is a representation of the data storage location, data stored in the data storage location, and intermediate values stored in the intermediate value storage location.

Figure 1:
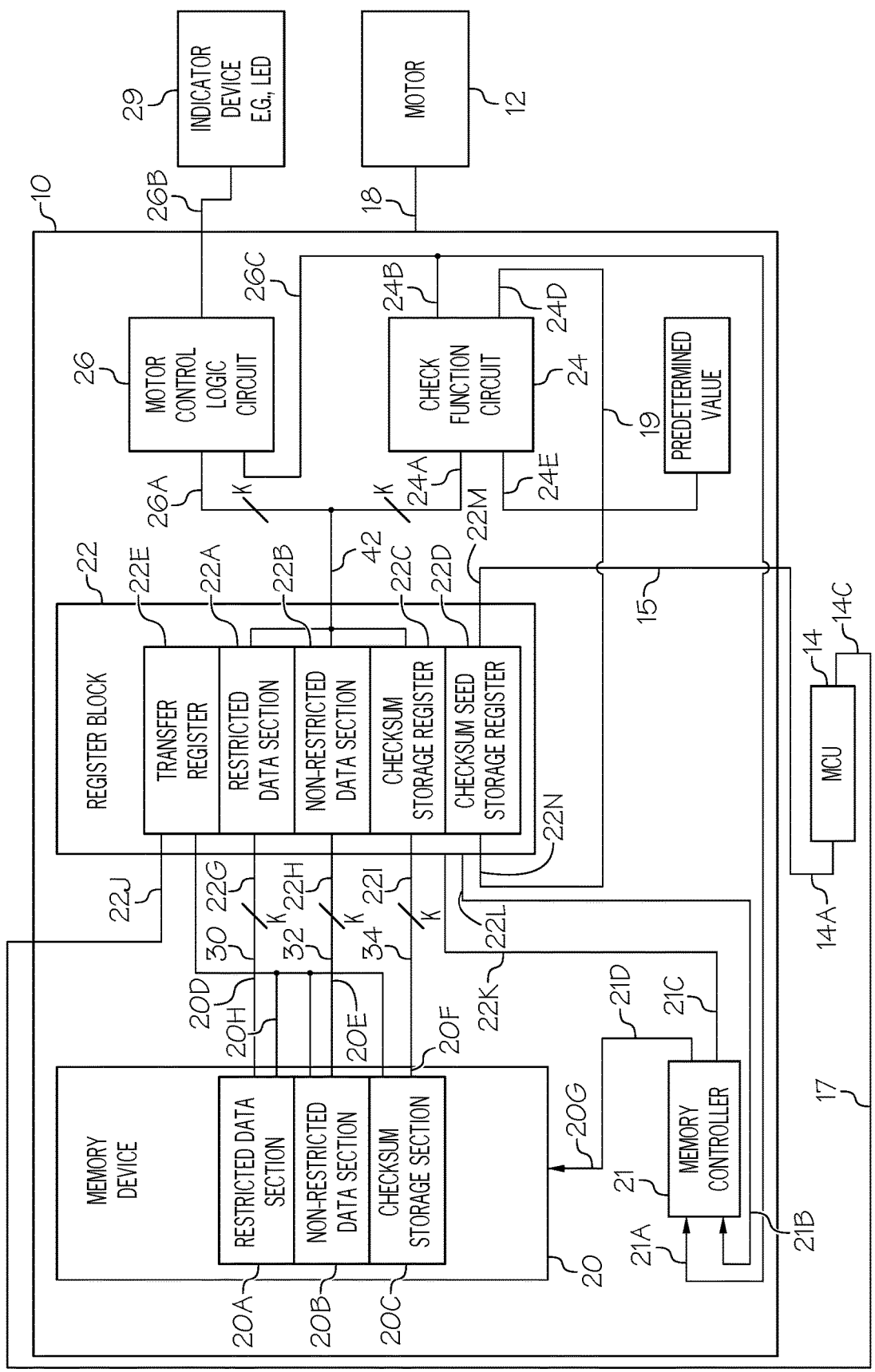
FIG. 1 is a block diagram of a motor driver circuit coupled to a motor and to a microcontroller unit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of being exactly as described.

DETAILED DESCRIPTION

Generally the present invention provides a method for verifying data at start-up and a circuit therefor. In accordance with an embodiment the method comprises providing a memory device and a register block, wherein the memory device has a first data section configured for storing restricted data, a second data section configured for storing non-restricted data, and a first checksum storage register and wherein the register block has a first data section configured for storing a copy of the restricted data, a second data section configured for storing a copy of the non-restricted data, a first checksum storage register, and a checksum seed storage register. The first restricted data value is copied from a first sub-section of the first data section of the memory device to a first sub-section of the first data section of the register block. A first non-restricted data value is copied from a first sub-section of the second data section of the memory device to a first sub-section of the second data section of the register block and a verification value is determined in response to the first restricted value, the first non-restricted value, and a checksum seed value. The verification value is used to verify the integrity of the data in the first data section of the memory device.

In accordance with another embodiment, the method comprises copying data from a memory device into a register and determining a checksum seed value and a checksum value from the data copied into the register. The checksum seed value and the checksum value are used to determine a verification value which is used to verify the integrity of the data in the memory device.

In accordance with an aspect, determining the verification value includes using an error detecting technique to generate the verification value.

In accordance with an aspect, using the error detecting technique comprises using a cyclic redundancy check technique.

In accordance with an aspect, determining the verification value includes using a look-up table to generate the verification value.

In accordance with an aspect, using the verification value to verify the integrity of the data in the first data section of the memory device includes comparing the verification value with a predetermined value; and generating a verification signal in response to the verification value being equal to the predetermined value.

In accordance with an aspect, generating an error signal in response to the verification value and the predetermined value being unequal.

In accordance with an aspect, the checksum seed value and the checksum value are determined from the data copied into the storage register by sequentially determining intermediate values using a cyclic redundancy check technique.

In accordance with an aspect, determining the checksum seed value and the checksum value from the data copied into the storage register comprises: using an initial intermediate value, a first data value copied to the register, and a cyclic redundancy check technique to determine a first calculated intermediate value; using the first calculated intermediate value, a second data value copied to the register, and the cyclic redundancy check technique to determine a second calculated intermediate value; using the second calculated intermediate value, a third data value copied to the register, and the cyclic redundancy check technique to determine a third calculated intermediate value; and using the third calculated intermediate value, a fourth data value copied to the register, and the cyclic redundancy check technique to determine a fourth calculated intermediate value.

In accordance with another embodiment a motor driver circuit comprises a memory device configured to have a reserved data section, a non-reserved data section, and a checksum storage section; a register block is coupled to the memory device, wherein the register block includes a checksum seed storage register. A check function circuit is coupled to the storage register.

FIG. 1 is a block diagram of a motor driver circuit 10 configured for driving a motor 12 in accordance with an embodiment of the present invention. What is shown in FIG. 1 is motor driver circuit 10 coupled to a microcontroller unit (MCU) 14, to motor 12, and to an indicator device 29. Motor driver circuit 10 is connected to microcontroller unit 14 via a serial peripheral interface 17 and to motor 12 via a signal bus 18. In accordance with an embodiment, an input 22J of register block 22 of motor driver circuit 10 is connected to output 14C of microcontroller unit 14 through serial peripheral interface 17. Thus, register block 22 is connected to MCU 14 through serial peripheral interface 17. Motor driver circuit 10 includes a memory device 20, a memory controller 21, a register block 22, a check function circuit 24, and a motor control logic circuit 26. Register block 22 may be comprised of one or more registers. A register may be referred to as a storage register. In accordance with an embodiment, memory device 20 is a One-Time Programmable (OTP) memory device having a restricted data section 20A, a non-restricted data section 20B, and a checksum storage section 20C. Restricted data section 20A of memory device 20 is connected to restricted data section 22A of register block 22 through a data bus interconnect 30, non-restricted data section 20B of memory device 20 is connected to non-restricted data section 22B of register block 22 through a data bus interconnect 32, and checksum storage section 20C of memory device 20 is connected to checksum storage register 22C of register block 22 through a data bus interconnect 34. By way of example, data bus interconnect 30 is connected to restricted data section 20A of memory device 20 through an input/output 20D of memory device and to restricted data section 22A of register block 22 through an input/output 22G of register block 22; data bus interconnect 32 is connected to non-restricted data section 20B of memory device 20 through an input/output 20E of memory device 20 and to non-restricted data section 22B of register block 22 through an input/output 22H of register block 22; and data bus interconnect 34 is connected to checksum storage section 20C of memory device 20 through an input/output 20F of memory device 20 and to checksum storage register 22C of register block 22 through an input/output 22I of register block 22. Data bus interconnects 30, 32, and 34 have k-channels, where variable "k" represents an integer equal to one or more.

Motor driver circuit 10 is manufactured so that restricted data section 20A is programmed with data by its manufacturer before motor driver circuit 10 is delivered to a customer. Restricted data section 20A is referred to as a restricted data section because the data stored in this section is blocked from access to anyone but the manufacturer of memory device 20. Restricted data section 20A may be referred to as a reserved data section, a hidden data area, a hidden data section, a non-disclosed data area or data section, a restricted data area or data section, a private data area or data section, a non-user data area or data section, or the like. Non-restricted data section 20B can be accessed by customers, thus it may be referred to as a non-secure data area or data section, a public data area or data section, a user data area or data section, an open data area or data section, an active data area or data section, a public data area or data section, a non-secure data area or data section, a user programmable data area or data section, or the like.

Checksum storage section 20C is a memory for storing a checksum value and can be referred to as a memory section or a section. By way of example, restricted data section 20A, non-restricted data section 20B, and checksum storage section 20C are k-bits wide and can be referred to as k-bit data storage locations or k-bit data banks. In accordance with an embodiment, variable "k" is eight, thus restricted data section 20A, non-restricted data section 20B, and checksum storage section 20C are 8-bits wide. However, this is not a limitation and variable "k" can be other integers such as, for example, two, four, sixteen, thirty-two, forty, sixty-four, etc.

Register block 22 includes at least a restricted data section 22A, a non-restricted data section 22B, a checksum storage register 22C, a checksum seed storage register 22D, and a transfer register 22E. Restricted data section 22A of register block 22 has an input connected to restricted data section 20A of memory device 20 through data bus interconnect 30 and to motor control logic circuit 26 and check function circuit 24 through a data bus interconnect 42; non-restricted data section 22B of register block 22 has an input connected to non-restricted data section 20B through data bus interconnect 32 and to motor control logic circuit 26 and check function circuit 24 through data bus interconnect 42; and checksum storage register 22C of register block 22 is connected to checksum storage section 20C of memory device 20 through data bus interconnect 34, and to motor control logic circuit 26 and checksum function circuit 24 though data bus interconnect 42.

Restricted data section 22A is referred to as a restricted data section because the data stored in this section is blocked from access to anyone but the manufacturer of register block 22. Restricted data section 22A may be referred to as a reserved data section, a hidden data area, a hidden data section, a non-disclosed data area or data section, a restricted data area or data section, a private data area or data section, a non-user data area or data section, or the like. Non-restricted data section 22B can be accessed by customers, thus it may be referred to as a non-secure data area or data section, a public data area or data section, a user data area or data section, an open data area or data section, an active data area or data section, a public data area or data section, a non-secure data area or data section, a user programmable data area or data section, or the like.

Checksum storage register 22C is a register for storing a checksum value. By way of example, restricted data section 22A, non-restricted data section 22B, checksum storage register 22C, checksum seed storage register 22D, and transfer register 22E are k-bits wide and can be referred to as k-bit registers, k-bit data storage locations, k-bit data banks, or the like. In accordance with an embodiment, variable "k" is eight, thus restricted data section 22A, non-restricted data section 22B, checksum storage register 22C, checksum seed storage register 22D, and transfer register 22E are 8-bits wide. However, this is not a limitation and variable "k" can be other integers such as, for example, two, four, sixteen, thirty-two, forty, sixty-four, etc.

Checksum seed storage register 22D has an output 22M and is connected from output 22M to input 14A of MCU 14 through serial peripheral interface 15. In addition, checksum seed storage register 22D has an input 22N connected to an output 24D of check function circuit 24 through a data bus interconnect 19.

Transfer register 22E of register block 22 is updated by microcontroller unit 14. In response to transfer register 22E being updated, register block 22 transmits a control signal from output 22L to input 21B of memory controller 21 to cause the transmission of updated data to memory device 20 or to enable transmission of the updated data to memory device 20.

Register block 22 further includes an input 22K connected to an output 21C of memory controller 21. The signal transmitted from output 21C of memory controller 21 to input 22K of register block 22 serves as a write timing signal for the data transmitted from memory device 20 to register block 22.

Check function circuit 24 has an output 24B connected to an input 21A of memory controller 21. In accordance with an embodiment, check function circuit 24 has a multi-channel input 24A which is comprised of k times eleven (k*11) bits, i.e., multi-channel input 24A is k*11 bits wide. Output 24B of check function circuit 24 is also connected to an input 26C of motor control logic circuit 26.

Memory controller 21 has an input 21A connected to output 24B of check function circuit 24, an input 21B connected to output 22L of register block 22, an output 21C connected to input 22K of register block 22, and an output 21D connected to an input 20G of memory device 20. Memory controller 21 outputs read and write signals so that data can be transferred between memory device 20 and register block 22 through data bus interconnects 30 and 32. In addition memory controller 21 outputs read and write signals so that data can be transferred from checksum storage section 20C to checksum storage register 22C through a data bus interconnect 34. Thus, memory controller 21 controls the copying of data from restricted data section 20A of memory device 20 to restricted data section 22A of register block 22, controls the copying of data from non-restricted data section 20B of memory device 20 to non-restricted data section 22B of register block 22, and controls the copying of data from checksum storage section 20C of memory device 20 to checksum storage register 22C of register block 22.

It should be noted that input 20G carries a plurality of signals which control OTP memory device 20.

Motor control logic circuit 26 has inputs 26A and 26C and an output 26B. In accordance with an embodiment, input 26A of motor control logic circuit 26 is a multi-channel input which is comprised of k times eleven (k*11) bits, i.e., multi-channel input 26A is k*11 bits wide. Input 26C of motor control logic circuit 26 is connected to output 24B of check function circuit 24 and output 26B of motor control logic circuit 26 serves as a diagnostic output of motor driver circuit 10, which may be connected to a diagnostic indicator circuit 29. By way of example, diagnostic indicator circuit 29 is a Light Emitting Diode (LED) that emits light in response to an error signal from motor control logic circuit 26. Diagnostic indicator circuit 29 is not limited to being an LED. Other suitable circuits or devices that can be configured to provide an indication of the status of motor driver circuit 10 may be used for diagnostic indicator circuit 29. In addition, motor control logic circuit 26 indirectly controls signal bus 18 via analog circuitry (not shown).

In accordance with an embodiment, memory device 20, register block 22, memory controller 21, check function circuit 24, and motor control logic circuit 26 are monolithically integrated in a semiconductor material to form motor driver circuit 10. However, this is not a limitation and motor driver circuit 10 may be comprised of discrete circuits or a combination of discrete and monolithically integrated circuits.

Figure 2A:
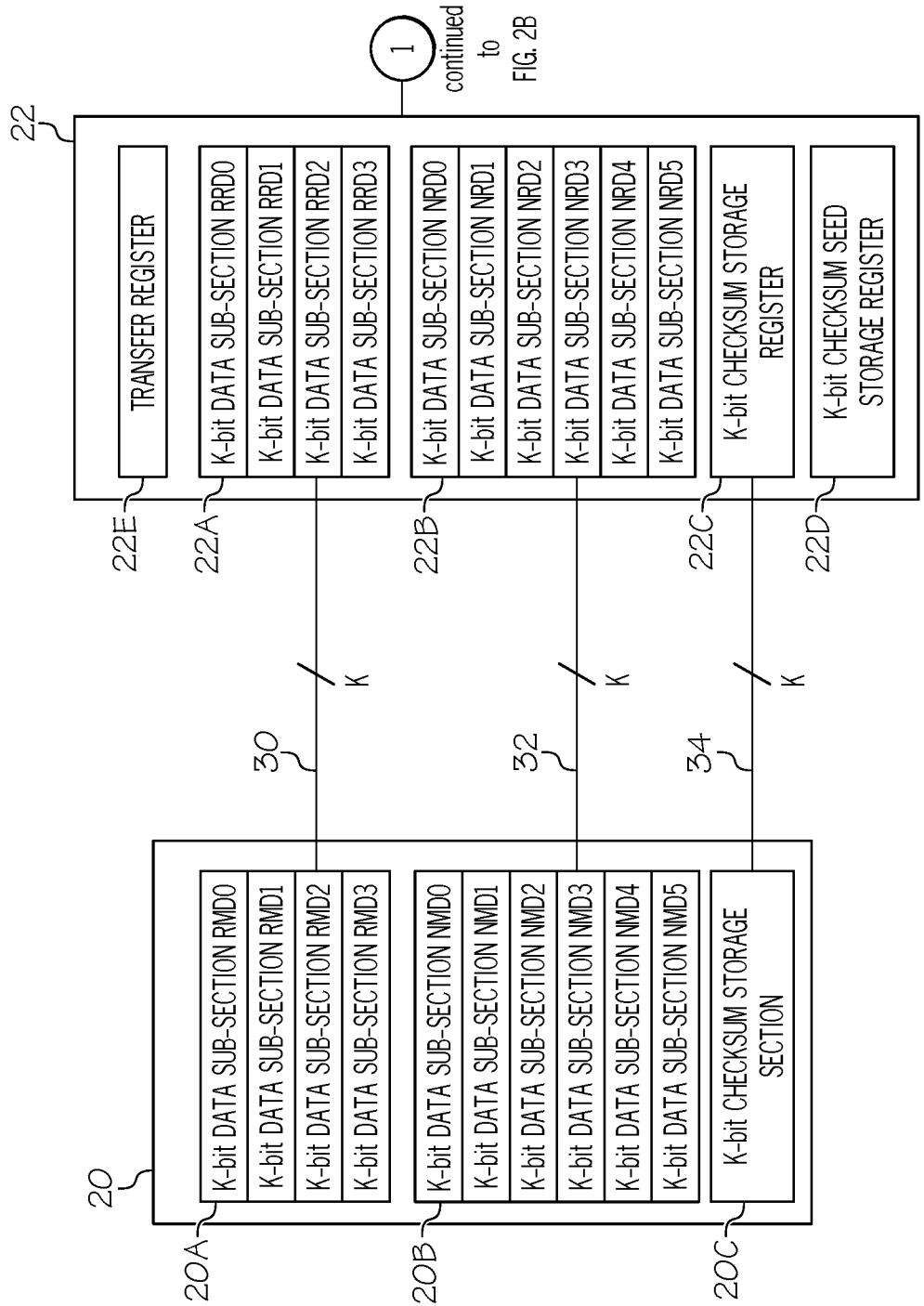
FIG. 2A is a block diagram of a first portion of the motor driver circuit of FIG. 1 in accordance with an embodiment of the present invention.
Figure 2B:
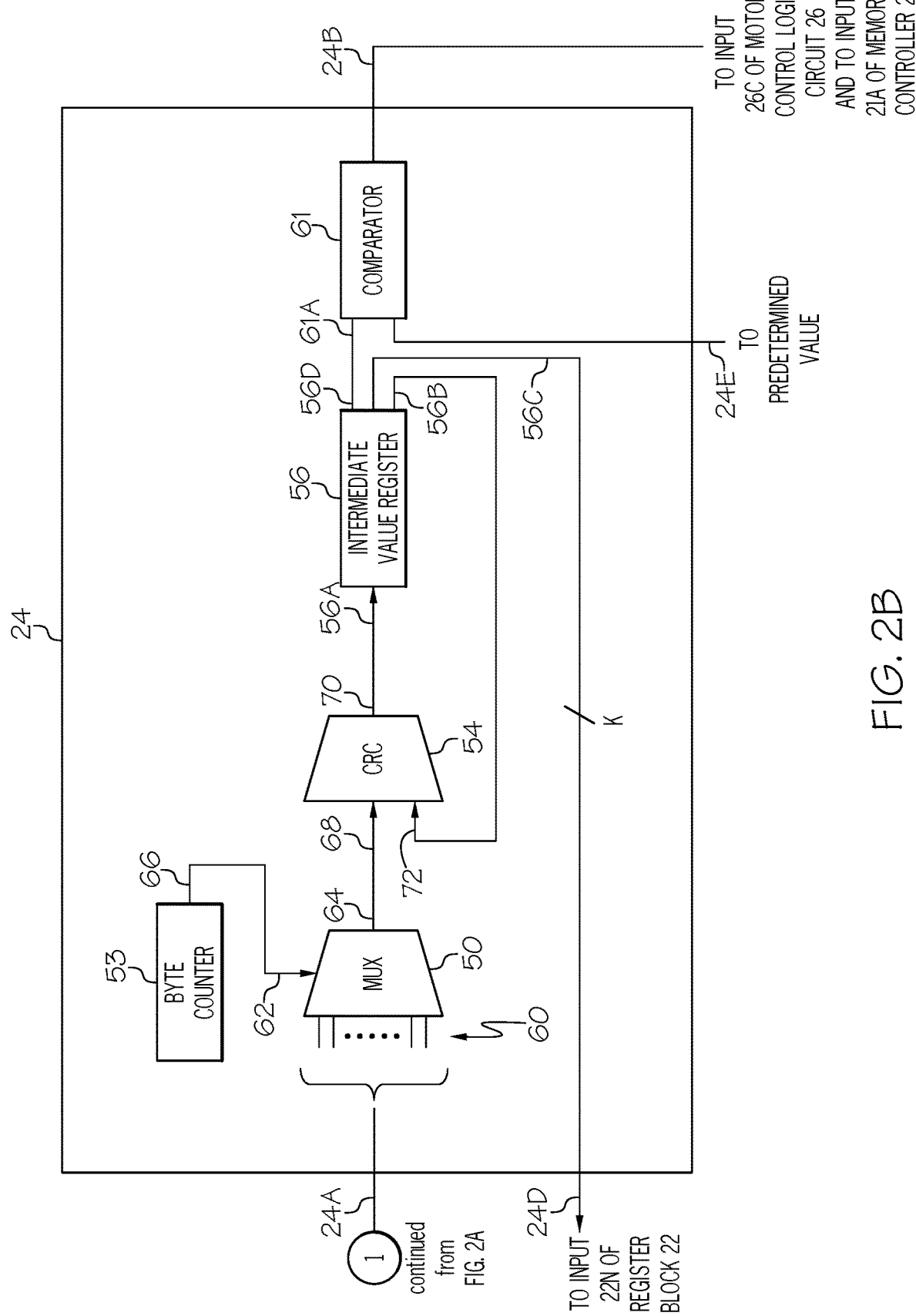
FIG. 2B is a block diagram of a second portion of the motor driver circuit of FIG. 1 configured for coupling to the first portion of the motor driver circuit of FIG. 2A in accordance with an embodiment of the present invention.

FIG. 2A is an expanded view of the block diagrams of memory device 20 and register block 22 shown in FIG. 1 and FIG. 2B is a block diagram of check function circuit 24 that is coupled to memory device 20, register block 22, memory controller 21, and motor control circuit 26. It should be appreciated that motor driver circuit 10 has been shown in two figures to better illustrate the details of the circuit elements. FIG. 2A illustrates restricted data section 20A of memory device 20 as having four k-bit data structures identified as k-bit data sub-section RMD0, k-bit data sub-section RMD1, k-bit data sub-section RMD2, and k-bit data sub-section RMD3. As discussed above, data sub-sections RMD0, RMD1, RMD2, and RMD3 are inaccessible to all but the manufacturer of motor driver circuit 10. By way of example, data sub-sections RMD0, RMD1, RMD2, and RMD3 may each be eight bits wide. Other suitable bit widths for data sub-sections RMD0, RMD1, RMD2, and RMD3 include two bits, four bits, sixteen bits, thirty-two bits, forty bits, sixty-four bits, etc. Data sub-sections RMD0, RMD1, RMD2, and RMD3 may be referred to as data storage sub-sections. In addition, FIG. 2A illustrates non-restricted data section 20B of memory device 20 as having six k-bit memory structures identified as k-bit data sub-section NMD0, k-bit data sub-section NMD1, k-bit data sub-section NMD2, k-bit data sub-section NMD3, k-bit data sub-section NMD4, and k-bit data sub-section NMD5. By way of example, data sub-sections NMD0, NMD1, NMD2, NMD3, NMD4, and NMD5 may each be eight bits wide. Other suitable bit widths for data sub-sections NMD0, NMD1, NMD2, NMD3, NMD4, and NMD5 include two bits, four bits, sixteen bits, thirty-two bits, forty bits, sixty-four bits, etc. Data sub-sections NMD0, NMD1, NMD2, and NMD3 may be referred to as data storage sub-sections. As discussed above, memory device 20 has a k-bit checksum storage section 20C. Like restricted data sub-sections RMD0, RMD1, RMD2, and RMD3 and non-restricted data sub-sections NMD0, NMD1, NMD2, NMD3, NMD4, and NMD5, k-bit checksum storage section 20C may be two bits wide, four bits wide, eight bits wide, sixteen bits wide, thirty-two bits wide, forty-bits wide, sixty-four bits wide, etc. K-bit checksum storage section 20C may be referred to as a k-bit data storage location.

FIG. 2A further illustrates register block 22 as having a restricted data section 22A, a non-restricted data section 22B, a checksum storage register 22C, a checksum seed storage register 22D, and a transfer register 22E. Restricted data section 22A is shown as having four k-bit data registers identified as k-bit data sub-section RRD0, k-bit data sub-section RRD1, k-bit data sub-section RRD2, and k-bit data sub-section RRD3. As discussed above, k-data data sub-sections RRD0, RRD1, RRD2, and RRD3 are inaccessible to customers and end-users of motor driver circuit 10. By way of example, k-bit data sub-sections RRD0, RRD1, RRD2, and RRD3 may each be eight bits wide. Other suitable bit widths for k-bit data sub-sections RRD0, RRD1, RRD2, and RRD3 include two bits, four bits, sixteen bits, thirty-two bits, forty bits, sixty-four bits, etc. Data sub-sections RRD0, RRD1, RRD2, and RRD3 may be referred to as data storage sub-sections. Non-restricted data section 22B is shown as comprising six k-bit data registers identified as k-bit data sub-section NRD0, k-bit data sub-section NRD1, k-bit data sub-section NRD2, k-bit data sub-section NRD3, k-bit data sub-section NRD4, and k-bit data sub-section NRD5. By way of example, k-bit data sub-sections NRD0, NRD1, NRD2, NRD3, NRD4, and NRD5 may each be eight bits wide. Other suitable bit widths fork bit-data sub-sections NRD0, NRD1, NRD2, NRD3, NRD4, and NRD5 include two bits, four bits, sixteen bits, thirty-two bits, forty bits, sixty-four bits, etc. Data sub-sections NRD0, NRD1, NRD2, and NRD3 may be referred to as data storage sub-sections. Register block 22 has a k-bit checksum storage register 22C. Like restricted data section 22A and non-restricted data section 22B, the k-bit checksum storage register 22C, and the checksum seed storage register 22D may be two bits wide, four bits wide, eight bits wide, sixteen bits wide, thirty-two bits wide, forty bits, sixty-four bits wide, etc. It should be noted that data sections 22A and 22B may be sub-blocks of register block 22 that include a plurality of registers.

In accordance with an embodiment, data sub-section RMD0 of memory device 20 is configured to transfer data to data sub-section RRD0 of register block 22 via data bus interconnect 30, data sub-section RMD1 of memory device 20 is configured to transfer data to data sub-section RRD1 of register block 22 via data bus interconnect 30, data sub-section RMD2 of memory device 20 is configured to transfer data to data sub-section RRD2 of register block 22 via data bus interconnect 30, data sub-section RMD3 of memory device 20 is configured to transfer data to data sub-section RRD3 of register block 22 via data bus interconnect 30, data sub-section NMD0 of memory device 20 is configured to transfer data to data sub-section NRD0 of register block 22 via data bus interconnect 32, data sub-section NMD1 of memory device 20 is configured to transfer data to data sub-section NRD1 of register block 22 via data bus interconnect 32, data sub-section NMD2 of memory device 20 is configured to transfer data to data sub-section NRD2 of register block 22 via data bus interconnect 32, data sub-section NMD3 of memory device 20 is configured to transfer data to data sub-section NRD3 of register block 22 via data bus interconnect 32, data sub-section NMD4 of memory device 20 is configured to transfer data to data sub-section NRD4 of register block 22 via data bus interconnect 32, data sub-section NMD5 of memory device 20 is configured to transfer data to data sub-section NRD5 of register block 22 via data bus interconnect 32, and k-bit checksum storage section 20C of memory device 20 is configured to transfer data to k-bit checksum storage register 22C of register block 22 via data bus interconnect 34.

FIG. 2B illustrates an embodiment in which check function circuit 24 comprises a multiplexer (MUX) 50, a byte counter 53, a cyclic redundancy check circuit 54, an intermediate value register 56, and a comparator 61. More particularly, multiplexer 50 has a k-channel input 60, an input 62, and an output 64. K-channel input 60 is coupled to multi-channel input 24A or, alternatively, serves as multi-channel input 24A, input 62 is coupled to an output 66 of byte counter 53, and output 64 is connected to an input 68 of cyclic redundancy check (CRC) circuit 54. Multiplexer 50 selects k-bits of data from the k*11 bits of multi-channel input 24A in accordance with the number stored in byte counter 53. Intermediate value register 56 has an input 56A connected to an output 70 of cyclic redundancy check circuit 54, an output 56B connected to an input 72 of cyclic redundancy check circuit 54, a k-bit output 56C configured for coupling to a k-bit input 22N of k-bit checksum seed storage register 22D of register block 22, and an output 56D.

Check function circuit 24 further includes a comparator 61 having an input 61A connected to output 56D of intermediate value register 56, an input 24E for receiving a constant predetermined value, and an output connected to or, alternatively, servicing as output 24B of check function circuit 24. By way of example, the constant predetermined value received at input 24E is 00 in hexadecimal. It should be noted that the constant predetermined value received at input 24E is not limited to being 00 in hexadecimal, and can be a different value. Briefly referring to FIG. 1, output 24B of check function circuit 24 is connected to input 26C of motor control logic circuit 26. The signal conveyed by output 24B indicates whether the results of the calculation from cyclic redundancy check circuit 54 are correct or not. Memory circuit 21 in combination with motor control logic circuit 26 decide the next behavior based on the signal transmitted by output 24B, i.e., they decide the next step.

It should be noted that after motor driver circuit 10 is manufactured, data is written to restricted data section 20A of motor driver circuit 10 by the manufacturer and a checksum seed value is generated by the manufacturer and provided to the customer. Register block 22 is a volatile storage register block in which data stored in the register block is lost when power is turned off or removed. Thus, the checksum seed value is re-calculated in response to a start-up sequence that occurs when register block 22 is turned on. Then, motor driver circuit 10 is sold or delivered to a customer who writes data into the non-restricted data section 20B. The customer then sells or ships motor driver circuit 10 to an end-user.

FIG. 3 is a representation 80 of a data structure before being programmed by the manufacturer. Data structure representation 80 illustrates three columns identified by reference characters 82, 84, and 86, where the column identified by reference character 82 represents count values or byte numbers in byte counter 53, the column identified by reference character 84 represents the data in one time programmable memory device 20, and the column identified by reference character 86 represents intermediate data that is stored in intermediate value register 56 during the operation of cyclic redundancy check circuit 54. The location identified by reference character 90 represents k-bit data sub-section RMD0 of restricted data section 20A, the location identified by reference character 91 represents k-bit data sub-section RMD1 of restricted data section 20A, the location identified by reference character 92 represents k-bit data sub-section RMD2 of restricted data section 20A, the location identified by reference character 93 represents k-bit data sub-section RMD3 of restricted data section 20A, the location identified by reference character 94 represents k-bit data sub-section NMD0 of non-restricted data section 20B, the location identified by reference character 95 represents k-bit data sub-section NMD1 of non-restricted data section 20B, the location identified by reference character 96 represents k-bit data sub-section NMD2 of non-restricted data section 20B, the location identified by reference character 97 represents k-bit data sub-section NMD3 of non-restricted data section 20B, the location identified by reference character 98 represents k-bit data sub-section NMD4 of non-restricted data section 20B, the location identified by reference character 99 represents k-bit data sub-section NMD5 of non-restricted data section 20B, and the location identified by reference character 100 represents k-bit checksum storage section 20C of memory device 20.

The location identified by reference character 88 represents the initial value of intermediate value register 56; the location identified by reference character 89 represents the location from which a checksum seed value will be extracted; and the location identified by reference character 87 represents a verification value storage location. It should be noted that in accordance with an embodiment, a verification value of 00 in hexadecimal in location 87 indicates that the data is error free, whereas any other verification value in location 87 indicates that an error may exist in the data.

It should be understood that after motor driver circuit 10 has been manufactured, the values in all the registers, such as registers 22A, 22B, 22C, 22D, and 22E, and the value in intermediate value register 56, which includes the values identified by reference characters 87, 88, and 89, are 00 in hexadecimal. It should be further understood that the registers of motor driver circuit 10 are reset by a power-on reset so that their values are 00 in hexadecimal. These registers include the registers of restricted data section 22A, non-restricted data section 22B, checksum storage register 22C, checksum seed storage register 22D, transfer register 22E, and intermediate value register 56. The locations identified by reference characters 87, 88, and 89 represent intermediate value register 56 at different times in the calculation process, i.e., the value stored in intermediate value register 56 is updated during the calculation. The locations identified by reference characters 90, 91, 92, 93, 94, 95, 96, 97, 98, 99, and 100 represent sections of restricted data section 20A, non-restricted data section 20B, and checksum storage section 20C and are manufactured to initially have a value of 00 in hexadecimal, i.e., these sections are part of memory device 20. In accordance with this example, memory device 20 is a one-time programmable memory device. The manufacturer programs the restricted data section 20A prior to shipment to the customer, i.e., the manufacturer programs memory locations identified by reference characters 90, 91, 92, and 93 that have been identified in FIGS. 3, 5, 7, and 8.

Figure 4:
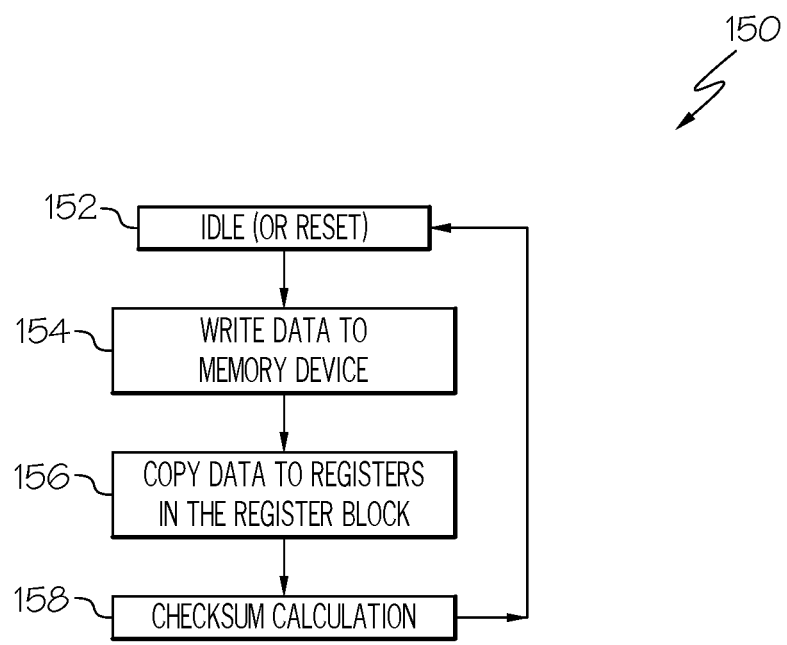
FIG. 4 is a flow diagram of a method for verifying data integrity in accordance with an embodiment of the present invention.

FIG. 4 is a flow diagram 150 of a method of programming motor driver circuit 10 so that a customer can verify the integrity of the data written to motor driver circuit 10 in accordance with an embodiment of the present invention. At a beginning step, motor driver circuit 10 is in an idle or reset state after manufacture (indicated by box 152).

In accordance with an embodiment and in response to power being applied to motor driver circuit 10, the manufacturer writes data to k-bit data sub-sections RMD0, RMD1, RMD2, and RMD3 of restricted data section 20A of memory device 20 shown in FIG. 2A. Writing the data to restricted data section 20A of memory device 20 is identified by box 154 of FIG. 4. By way of example, the manufacturer has written data values of 11 in hexadecimal, 22 in hexadecimal, 33 in hexadecimal, and 44 in hexadecimal to k-bit data sub-sections RMD0, RMD1, RMD2, and RMD3 of restricted data section 20A of memory device 20, respectively. The k-bit data sub-sections NMD0, NMD1, NMD2, NMD3, NMD4, and NMD5, and k-bit checksum storage section 20C each contain the data value 00 in hexadecimal because data has not been written to these locations. In accordance with this embodiment, the applicant uses four k-bit data sub-sections, i.e., sub-sections RMD0, RMD1, RMD2, and RMD3 to store information that is not accessible to a customer. Alternatively, more data sub-sections or fewer data sub-sections can be used to store data that is inaccessible to a customer.

Cyclic redundancy check circuit 54 uses the data in data sub-sections RMD0, RMD1, RMD2, and RMD3 to calculate values that are stored in intermediate value register 56. In accordance with this embodiment, the intermediate value calculated using the value stored in the last k-bit data sub-section of restricted data section 20A serves as a checksum seed value, i.e., the value stored in intermediate value register 56 that has been calculated from the value stored in k-bit data sub-section RMD3. As the counter is incremented, the value stored in intermediate value register 56 is updated with the calculation result. In this example, the checksum seed value will be derived from the k-bit register of intermediate value register 56 associated with k-bit data sub-section RMD3. Accordingly, motor driver circuit 10 associates the checksum seed value stored in intermediate value register 56 resulting from the calculation using the data value stored in k-bit data sub-section RMD3 with a count value that will appear in byte counter 53. In accordance with this embodiment, the last k-bit data sub-section of restricted data section 20A is k-bit data sub-section RMD3, which would result in the fourth calculation result from cyclic redundancy check circuit 54. The fourth calculation result is stored in intermediate value register 56 and is associated with a count value of 03 in hexadecimal since the byte counter 53 starts counting at a value of 00 in hexadecimal. In this example, the checksum seed value is the value stored in the storage location identified by reference character 89, which calculation value results from the value stored in k-bit sub-section RMD3 of restricted data section 20A. The value at the location identified by reference character 89, i.e., 25 in hexadecimal, is stored in checksum seed storage register 22D. It should be noted that the count values start at 00 in hexadecimal, thus the storage location identified by a count value of three in hexadecimal is the fourth storage location, i.e., the storage location identified by reference character 89.

Referring to the calculations of the values stored in intermediate value register 56, memory controller 21 generates read/write signals which cause motor driver circuit 10 to read the data stored in k-bit data sub-sections RMD0, RMD1, RMD2, and RMD3 of restricted data section 20A, the data stored in k-bit data sub-sections NMD0, NMD1, NMD2, NMD3, NMD4, and NMD5 of non-restricted data storage location 20B, and the checksum value stored in checksum storage section 20C and write the data to corresponding data sub-sections RRD0, RRD1, RRD2, and RRD3 of restricted data section 22A, data sub-sections NRD0, NRD1, NRD2, NRD3, NRD4, and NRD5 of non-restricted data section 22B, and the checksum storage section 22C of register block 22, respectively. Reading data from data sub-sections RMD0, RMD1, RMD2, RMD3, NMD0, NMD1, NMD2, NMD3, NMD4, and NMD5, and checksum storage section 20C of memory device 20 and writing the data to data sub-sections RRD0, RRD1, RRD2, RRD3, NRD0, NRD1, NRD2, NRD3, NRD4, and NRD5, and checksum storage register 22C of register block 22, respectively, may be referred to as copying the data and is identified by box 156 in flow diagram 150.

Referring to FIGS. 4 and 5, memory controller 21: copies the data from data sub-section RMD0 of memory device 20 (identified by reference character 90 of FIG. 5) into data sub-section RRD0 of register block 22; copies the data from data sub-section RMD1 of memory device 20 (identified by reference character 91 of FIG. 5) into data sub-section RRD1 of register block 22; copies the data from data sub-section RMD2 of memory device 20 (identified by reference character 92 of FIG. 5) into data sub-section RRD2 of register block 22; copies the data from data sub-section RMD3 of memory device 20 (identified by reference character 93 in FIG. 5) into data sub-section RRD3 of register block 22; copies the data from data sub-section NMD0 of memory device 20 (identified by reference character 94 in FIG. 5) into data sub-section NRD0 of register block 22; copies the data from data sub-section NMD1 of memory device 20 (identified by reference character 95 in FIG. 5) into data sub-section NRD1 of register block 22; copies the data from data sub-section NMD2 of memory device 20 (identified by reference character 96 in FIG. 5) into data sub-section NRD2 of register block 22; copies the data from data sub-section NMD3 of memory device 20 (identified by reference character 97 in FIG. 5) into data sub-section NRD3 of register block 22; copies the data from data sub-section NMD4 of memory device 20 (identified by reference character 98 in FIG. 5) into data sub-section NRD4 of register block 22; copies the data from data sub-section NMD5 of memory device 20 (identified by reference character 99 in FIG. 5) into data sub-section NRD5 of register block 22; and copies the data from k-bit checksum storage section 20C into k-bit checksum storage register 22C. This write operation may occur automatically within motor driver circuit 10 to internally transfer data from memory device 20 to register block 22. In the example shown in FIG. 5, 11 in hexadecimal is written to data storage section RMD0 (identified by reference character 90); 22 in hexadecimal is written to data storage section RMD1 (identified by reference character 91); 33 in hexadecimal is written to data storage section RMD2 (identified by reference character 92); 44 in hexadecimal is written to data storage section RMD3 (identified by reference character 93); 00 in hexadecimal is written to data storage section NMD0 (identified by reference character 94); 00 in hexadecimal is written to data storage section NMD1 (identified by reference character 95); 00 in hexadecimal is written to data storage section NMD2 (identified by reference character 96); 00 in hexadecimal is written to data storage section NMD3 (identified by reference character 97); 00 in hexadecimal is written to data storage section NMD4 (identified by reference character 98); 00 in hexadecimal is written to data storage section NMD5 (identified by reference character 99); and 00 in hexadecimal is written to k-bit checksum storage register 22C. Those skilled in the art understand that data is typically retrieved or read from a memory location and stored in or written to a register before mathematical or logical operations are performed using the data.

Referring now to the step illustrated by box 158 of FIG. 4 and referring to FIG. 5, check function circuit 24 generates a checksum seed value. Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20.

Cyclic redundancy check circuit 54 sequentially uses the data values stored in restricted data sub-sections 22A and 22B, and the data value stored in checksum storage register 22C and intermediate values to calculate updated intermediate values for each of the data storage locations in register block 22 and to generate a checksum seed value and a verification value. For example, cyclic redundancy check circuit 54 generates an updated intermediate value using the previous intermediate value and the current data value. In the example shown in FIG. 5, an initial intermediate hexadecimal value of 00 is provided and cyclic redundancy check circuit 54 uses this value and the hexadecimal data value 11 in the storage location identified by reference character 90 to calculate an updated intermediate hexadecimal value E4. Cyclic redundancy check circuit 54 continues generating updated intermediate hexadecimal values based on the previous intermediate hexadecimal value and the current data hexadecimal value. In the example of FIG. 5, cyclic redundancy check circuit 54 generates an updated intermediate hexadecimal value A1 based on previous intermediate hexadecimal value E4 and data hexadecimal value 22 in the storage location identified by reference character 91. Cyclic redundancy check circuit 54 generates an updated intermediate hexadecimal value 4F based on previous intermediate hex value A1 and data hexadecimal value 33 in the storage location identified by reference character 92. Cyclic redundancy check circuit 54 generates an updated intermediate hexadecimal value 25 based on previous intermediate hexadecimal value 4F and data hexadecimal value 44 in the storage location identified by reference character 93.

Check function circuit 24 continues sequentially calculating intermediate values. It should be noted that the values in storage locations identified by reference characters 94, 95, 96, 97, 98, 99, and 100 are 00 in hexadecimal and are initial values that result from the manufacture of motor driver circuit 10, i.e., they are not programmed values. Accordingly, cyclic redundancy check circuit 54 generates an updated intermediate hex value 2B based on previous intermediate hex value 25 and data hex value 00 in the storage location identified by reference character 94. Cyclic redundancy check circuit 54 generates an updated intermediate hex value 3A based on previous intermediate hex value 2B and data hex value 00 in the storage location identified by reference character 95. Cyclic redundancy check circuit 54 generates an updated intermediate hex value DE based on previous intermediate hex value 3A and data hex value 00 in the storage location identified by reference character 96. Cyclic redundancy check circuit 54 generates an updated intermediate hex value FA based on previous intermediate hex value DE and data hex value 00 in the storage location identified by reference character 97. Cyclic redundancy check circuit 54 generates an updated intermediate hex value 9C based on previous intermediate hex value FA and data hex value 00 in the storage location identified by reference character 98. Cyclic redundancy check circuit 54 generates an updated intermediate hex value 5E based on previous intermediate hex value 9C and data hex value 00 in the storage location identified by reference character 99. Cyclic redundancy check circuit 54 generates an updated intermediate hex value 86 (shown in the box identified by reference character 87) based on previous intermediate hex value 5E and data hex value 00 in the storage location identified by reference character 100, which storage location 100 corresponds to k-bit checksum storage register 22C. It should be noted that the values are hexadecimal values and that the value 25 in the location identified by reference character 89 serves as the checksum seed value. Although the values are shown as hexadecimal values, this is not a limitation. The values can be in other numeric formats or other data formats. The checksum seed value is known to the customer, but the data values in the storage locations identified by reference characters 90, 91, 92, and 93 are unknown to anyone but the manufacturer of motor driver circuit 10. The checksum seed value represents the data stored in k-bit data sub-sections RMD0, RMD1, RMD2, and RMD3. Motor driver circuit 10 writes the checksum seed value to k-bit check sum seed storage register 22D and returns to the idle state.

It should be noted that check function circuit 24 generates a plurality of intermediate values. Applicants have devised a technique by which one of the intermediate values serves as a checksum seed value. The value is identified by a count value in byte counter 53. In accordance with the present example, the count value associated with the checksum seed is three, thus the value in intermediate value register 56 when the count value in byte counter 53 is three serves as the checksum seed value. In this example, a value of 25 in hexadecimal is in intermediate value register 56 when the count value in byte counter 53 is three. The values that are stored in intermediate value register 56 are illustrated by column 86 in FIG. 5 and the value associated with the count value of three is identified by reference character 89. Thus, the checksum seed value is 25 in hexadecimal. Check function circuit 24 writes the checksum seed value 25 to k-bit checksum seed storage register 22D via data bus interconnect 19.

It should be appreciated that the count value in byte counter 53 that identifies the checksum seed value is not limited to being three. Other applications may use fewer than four restricted k-bit data sub-sections or more than four k-bit data sub-sections. Thus, the count value that identified the checksum seed value may be less than three or greater than three.

Figure 6:
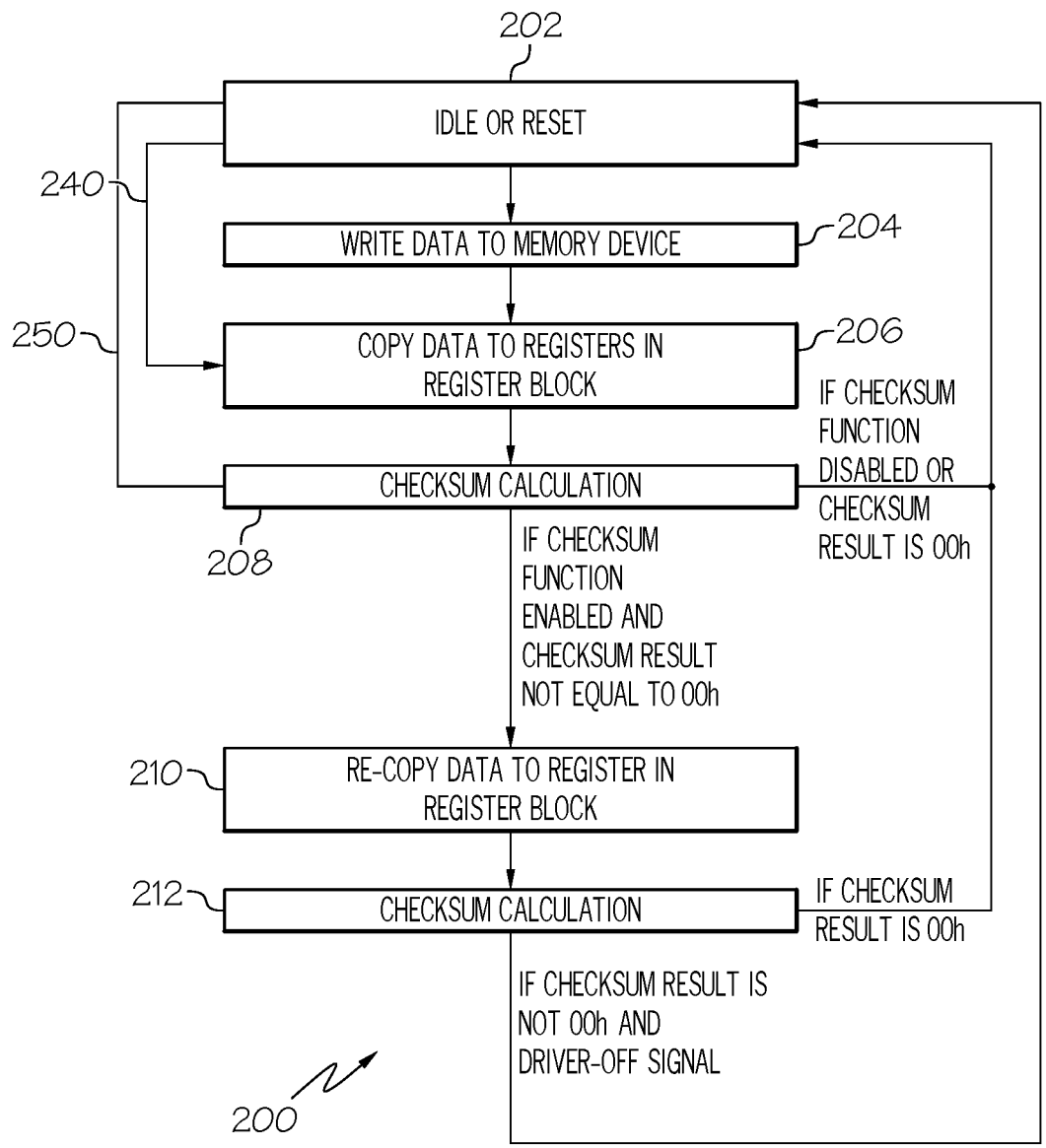
FIG. 6 is a flow diagram of a method for verifying data integrity in accordance with an embodiment of the present invention.

The operation of verifying the integrity of the data in memory device 20 will be further described with reference to FIGS. 5, 6, and 7. FIG. 6 is a flow diagram 200 of a method for verifying the integrity of data used by a motor driver circuit like motor driver circuit 10 in accordance with an embodiment of the present invention. FIG. 5 is a representation of data stored in memory device 20 after programming of motor driver circuit 10 by the manufacturer, i.e., it is an example of the data that can be stored in restricted data section 20A, non-restricted data section 20B, byte counter 53, and intermediate value register 56 by the manufacturer of motor driver circuit 10 and delivered to a customer. FIG. 7 is a representation of data stored in restricted data section 20A, non-restricted data section 20B, checksum storage section 20C, the count value in byte counter 53, and intermediate value register 56 after startup and after the motor driver circuit 10 has been programmed by a customer. In addition FIG. 7 illustrates that the calculation proceeds from top to bottom.

As described in the example of FIG. 4, the manufacturer has programmed restricted data section 20A such that 11 in hexadecimal is written to data storage sub-section RMD0 (identified by reference character 90); 22 in hexadecimal is written to data storage sub-section RMD1 (identified by reference character 91); 33 in hexadecimal is written to data storage sub-section RMD2 (identified by reference character 92); and 44 in hexadecimal is written to data storage sub-section RMD3 (identified by reference character 93). As discussed above, the manufacture of motor driver circuit 10 results in 00 in hexadecimal being in each of data sub-sections NMD0, NMD1, NMD2, NMD3, NMD4, and NMD5 (identified by reference characters 94, 95, 96, 97, 98, and 99, respectively) and in the checksum storage section identified by reference character 100, as well as in the verification value storage location indicated by reference character 87, in the intermediate storage location identified by reference characters 88 and 89. Thus, at the idle or reset state indicated by box 202, data storage sub-section RMD0 contains 11 in hexadecimal, data storage sub-section RMD1 contains 22 in hexadecimal, data storage sub-section RMD2 contains 33 in hexadecimal, and data storage sub-section RMD3 contains 44 in hexadecimal. Data sub-sections NMD0, NMD1, NMD2, NMD3, NMD4, and NMD5, checksum storage section 100, verification value storage location 87, and intermediate storage locations 88 and 89 each contain 00 in hexadecimal. The data written to restricted data section 20A includes trimming data for analog circuitry and other data for motor driver circuit 10 that does not need to be set by, for example, a customer.

In response to being initially powered up, motor driver circuit 10 copies data from restricted data section 20A, non-restricted data section 20B, and checksum storage section 20C of memory device 20 to restricted data section 22A, non-restricted data section 22B, and checksum storage register 22C of register block 22 as indicated by the path along reference character 240 from box 202 to box 206. More particularly, memory controller 21 generates read/write signals which cause motor driver circuit 10 to read the data stored in data sub-sections RMD0, RMD1, RMD2, and RMD3 of restricted data section 20A, read the data stored in data sub-sections NMD0, NMD1, NMD2, NMD3, NMD4, and NMD5 of non-restricted data storage location 20B, and read the checksum value stored in checksum storage section 20C and write the data to corresponding data sub-sections RRD0, RRD1, RRD2, and RRD3 of restricted data section 22A, data sub-sections NRD0, NRD1, NRD2, NRD3, NRD4, and NRD5 of non-restricted data section 22B, and the checksum storage register 22C, respectively. Reading data from data sub-sections RMD0, RMD1, RMD2, RMD3, NMD0, NMD1, NMD2, NMD3, NMD4, and NMD5, and checksum storage section 20C and writing data to data sub-sections RRD0, RRD1, RRD2, RRD3, NRD0, NRD1, NRD2, NRD3, NRD4, and NRD5, and checksum storage register 22C, respectively, may be referred to as copying the data and is identified by box 206 in flow diagram 200.

Thus, in response to the read/write signals from memory controller 21, motor driver circuit 10: copies the data from data sub-section RMD0 of memory device 20 (identified by reference character 90 of FIG. 5) into data sub-section RRD0 of register block 22; copies the data from data sub-section RMD1 of memory device 20 (identified by reference character 91 of FIG. 5) into data sub-section RRD1 of register block 22; copies the data from data sub-section RMD2 of memory device 20 (identified by reference character 92 of FIG. 5) into data sub-section RRD2 of register block 22; copies the data from data sub-section RMD3 of memory device 20 (identified by reference character 93 in FIG. 5) into data sub-section RRD3 of register block 22; and copies the data from k-bit checksum storage section 20C into k-bit checksum storage register 22C. In addition, motor driver circuit 10 copies the data values in data sub-sections NMD0, NMD1, NMD2, NMD3, NMD4, NMD5, and checksum storage section 20C from memory device 20 into data sub-sections NRD0, NRD1, NRD2, NRD3, NRD4 and NRD5, and checksum storage section 20C into checksum storage register 22C, respectively.

This write operation may occur automatically within motor driver circuit 10 to internally transfer data from memory device 20 to register block 22. In the example shown in FIG. 5, 11 in hexadecimal is written to data sub-section RRD0 (identified by reference character 90); 22 in hexadecimal is written to data sub-section RRD1 (identified by reference character 91); 33 in hexadecimal is written to data sub-section RRD2 (identified by reference character 92); 44 in hexadecimal is written to data sub-section RRD3 (identified by reference character 93); 00 in hexadecimal is written to data sub-section NRD0 (identified by reference character 94); 00 in hexadecimal is written to data sub-section NRD1 (identified by reference character 95); 00 in hexadecimal is written to data sub-section NRD2 (identified by reference character 96); 00 in hexadecimal is written to data sub-section NRD3 (identified by reference character 97); 00 in hexadecimal is written to data sub-section NRD4 (identified by reference character 98); 00 in hexadecimal is shown as being written to data sub-section NRD5 (identified by reference character 99); and 00 in hexadecimal is shown as being written to k-bit checksum storage register 22C. Those skilled in the art understand that data is typically retrieved from or read from a memory location and stored in or written to a register before mathematical or logical operations are performed using the data. Thus, the data values in k-bit data storage locations RRD0, RRD1, RRD2, RRD3, NRD0, NRD1, NRD2, NRD3, NRD4, NRD5, and checksum register 22C of register block 22 are equal to or match the data values in k-bit data storage locations RMD0, RMD1, RMD2, RMD3, NMD0, NMD1, NMD2, NMD3, NMD4, NMD5, and checksum storage section 20C of memory device 20, respectively.

Referring now to the step illustrated by box 208 of FIG. 6, check function circuit 24 calculates a checksum seed value using the data stored in the k-bit data sub-sections RRD0, RRD1, RRD2, and RRD3 of register block 22, which is representative of the data in k-bit data sub-sections RMD0, RMD1, RMD2, and RMD3 of memory device 20. Cyclic redundancy check circuit 54 sequentially uses the data values stored in restricted data sub-sections 22A and 22B, checksum storage register 22C, and intermediate values to calculate updated intermediate values for each of the data storage locations in register block 22 and to generate a checksum seed value and a checksum value. For example, cyclic redundancy check circuit 54 generates an updated intermediate value using the previous intermediate value and the current data value. At this stage, the values in the locations identified by reference characters 90-100 and 88 are the same as the values shown in FIG. 5. In the example shown in FIG. 5, an initial intermediate hexadecimal value of 00 is provided and cyclic redundancy check circuit 54 uses this value and the hexadecimal data value 11 in the storage location identified by reference character 90 to calculate an updated intermediate hexadecimal value E4. Cyclic redundancy check circuit 54 continues generating updated intermediate hexadecimal values based on the previous intermediate hexadecimal value and the current data hexadecimal value. In the example of FIG. 5, cyclic redundancy check circuit 54 generates an updated intermediate hexadecimal value A1 based on previous intermediate hexadecimal value E4 and data hexadecimal value 22 in the storage location identified by reference character 91. Cyclic redundancy check circuit 54 generates an updated intermediate hexadecimal value 4F based on previous intermediate hexadecimal value A1 and data hexadecimal value 33 in the storage location identified by reference character 92. Cyclic redundancy check circuit 54 generates an updated intermediate hexadecimal value 25 based on previous intermediate hexadecimal value 4F and data hexadecimal value 44 in the storage location identified by reference character 93.

Check function circuit 24 continues sequentially calculating intermediate values. It should be noted that the values in storage locations identified by reference characters 94, 95, 96, 97, 98, 99, and 100 are 00 in hexadecimal and are initial values that result from the manufacture of motor driver circuit 10, i.e., they are not programmed values. Accordingly, cyclic redundancy check circuit 54 generates an updated intermediate hexadecimal value 2B based on previous intermediate hexadecimal value 25 and data hexadecimal value 00 in the storage location identified by reference character 94. Cyclic redundancy check circuit 54 generates an updated intermediate hexadecimal value 3A based on previous intermediate hexadecimal value 2B and data hexadecimal value 00 in the storage location identified by reference character 95. Cyclic redundancy check circuit 54 generates an updated intermediate hexadecimal value DE based on previous intermediate hexadecimal value 3A and data hexadecimal value 00 in the storage location identified by reference character 96. Cyclic redundancy check circuit 54 generates an updated intermediate hexadecimal value FA based on previous intermediate hexadecimal value DE and data hexadecimal value 00 in the storage location identified by reference character 97. Cyclic redundancy check circuit 54 generates an updated intermediate hexadecimal value 9C based on previous intermediate hexadecimal value FA and data hexadecimal value 00 in the storage location identified by reference character 98. Cyclic redundancy check circuit 54 generates an updated intermediate hexadecimal value 5E based on previous intermediate hexadecimal value 9C and data hexadecimal value 00 in the storage location identified by reference character 99. Cyclic redundancy check circuit 54 generates an updated intermediate hexadecimal value 86 (shown in the box identified by reference character 87) based on previous intermediate hexadecimal value 5E and data hexadecimal value 00 in the storage location identified by reference character 100, which storage location 100 corresponds to k-bit checksum storage register 22C. It should be noted that the values are hexadecimal values and that the value 25 in the location identified by reference character 89 serves as the checksum seed value. Although the values are shown as hexadecimal values, this is not a limitation. The values can be in other numeric formats or other data formats. The checksum seed value is known to the customer, but the data values in the storage locations identified by reference characters 90, 91, 92, and 93 are unknown to anyone but the manufacturer of motor driver circuit 10. The checksum seed value represents the data stored in k-bit data sub-sections RMD0, RMD1, RMD2, and RMD3. Motor driver circuit 10 writes the checksum seed value to k-bit check sum seed storage register 22D.

It should be appreciated that check function circuit 24 generates a plurality of intermediate values. Applicants have devised a technique by which one of the intermediate values serves as a checksum seed value. The value is identified by a count value stored in byte counter 53. In accordance with the present example, the count value is three and the value associated with the count value of three is in the storage location identified by reference character 89 and serves as the checksum seed value, i.e., 25 in hexadecimal. Thus, check function circuit 24 writes the checksum seed value 25 to k-bit checksum seed storage register 22D.

Still referring to checksum calculation box 208 and as discussed above, the least significant bit of the data in data sub-section NMD5 serves as an enable bit. In response to the least significant bit being zero (0) or the checksum calculation being 00 in hexadecimal in storage location 87, motor driver circuit 10 returns to the idle state. In response to the least significant bit being one (1) and the checksum result not being equal to 00 in hexadecimal, i.e. the value in verification value storage location 87 not being equal to 00 in hexadecimal, motor driver circuit 10 continues to box 210 to re-calculate the checksum value to determine if the data has been corrupted or is in error. In this example, all the bits stored in data sub-section NMD5 are zero, thus the motor driver circuit 10 returns to the idle state indicated by box 202. It should be noted that when the least significant bit in data sub-section NMD5 is zero (0), the checksum function is referred to as being disabled and when the least significant bit in data sub-section NMD5 is one (1), the checksum function is referred to as being enabled.

In response to being in idle mode (box 202), motor driver circuit 10 transmits the checksum seed value stored in checksum seed storage register 22D to transfer register 22E. MCU 14 then reads the checksum seed value from transfer register 22E via serial peripheral interface (SPI) 15. MCU 14 uses the data to be written to non-restricted data section 22B, the checksum seed value, the value that serves as an initial value of intermediate value register 56 (shown in FIG. 2), and cyclic redundancy equations to calculate the checksum value.

MCU 14 generates a trigger signal to write the data stored in MCU 14 (e.g., 55 in hex) to data sub-section NMD0. More particularly, the trigger signal is a register write signal that writes the data to transfer register 22E via serial peripheral interface 17. In response to the data being written to transfer register 22E, memory controller 21 generates a read/write signal that copies the data from transfer register 22E to data sub-section NMD0 (indicated by box 204). In response to the data being written into data sub-section NMD0, memory controller 21 generates a read/write signal to transfer the data from data sub-section NMD0 to data sub-section NRD0 (indicated by box 206) via data bus interconnect 32.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. At the step identified by box 208, all the bits stored in data sub-section NMD5 are zero, thus the motor driver circuit 10 returns to the idle state indicated by box 202.

MCU 14 generates another trigger signal to write the data stored in MCU 14 (e.g., 66 in hexadecimal) to data sub-section NMD1. More particularly, the trigger signal is a register write signal that writes the data to transfer register 22E via serial peripheral interface 17. In response to the data being written to transfer register 22E, memory controller 21 generates a read/write signal that copies the data from transfer register 22E to data sub-section NMD1 (indicated by box 204). In response to the data being written into data sub-section NMD1, memory controller 21 generates a read/write signal to transfer the data from data sub-section NMD1 to data sub-section NRD1 (indicated by box 206) via data bus interconnect 32.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. Because all the bits stored in data sub-section NMD5 are zero, the motor driver circuit 10 returns to the idle state indicated by box 202.

MCU 14 generates another trigger signal to write the data stored in MCU 14 (e.g., 77 in hexadecimal) to data sub-section NMD2. More particularly, the trigger signal is a register write signal that writes the data to transfer register 22E via serial peripheral interface 17. In response to the data being written to transfer register 22E, memory controller 21 generates a read/write signal that copies the data from transfer register 22E to data sub-section NMD2 (indicated by box 204). In response to the data being written into data sub-section NMD2, memory controller 21 generates a read/write signal to transfer the data from data sub-section NMD2 to data sub-section NRD2 (indicated by box 206) via data bus interconnect 32.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. Because all the bits stored in data sub-section NMD5 are zero, the motor driver circuit 10 returns to the idle state indicated by box 202.

MCU 14 generates another trigger signal to write the data stored in MCU 14 (e.g., 88 in hex) to data sub-section NMD3. More particularly, the trigger signal is a register write signal that writes the data to transfer register 22E via serial peripheral interface 17. In response to the data being written to transfer register 22E, memory controller 21 generates a read/write signal that copies the data from transfer register 22E to data sub-section NMD3 (indicated by box 204). In response to the data being written into data sub-section NMD3, memory controller 21 generates a read/write signal to transfer the data from data sub-section NMD3 to data sub-section NRD3 (indicated by box 206) via data bus interconnect 32.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. Because all the bits stored in data sub-section NMD5 are zero, the motor driver circuit 10 returns to the idle state indicated by box 202.

MCU 14 generates another trigger signal to write the data stored in MCU 14 (e.g., 99 in hex) to data sub-section NMD4. More particularly, the trigger signal is a register write signal that writes the data to transfer register 22E via serial peripheral interface 17. In response to the data being written to transfer register 22E, memory controller 21 generates a read/write signal that copies the data from transfer register 22E to data sub-section NMD4 (indicated by box 204). In response to the data being written into data sub-section NMD4, memory controller 21 generates a read/write signal to transfer the data from data sub-section NMD4 to data sub-section NRD4 (indicated by box 206) via data bus interconnect 32.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. In response to all the bits stored in data sub-section NMD5 being zero, motor driver circuit 10 returns to the idle state indicated by box 202.

MCU 14 generates another trigger signal to write the data stored in MCU 14 (e.g., AB in hex) to data sub-section NMD5. More particularly, the trigger signal is a register write signal that writes the data to transfer register 22E via serial peripheral interface 17. In response to the data being written to transfer register 22E, memory controller 21 generates a read/write signal that copies the data from transfer register 22E to data sub-section NMD5 (indicated by box 204). In response to the data being written into data sub-section NMD5, memory controller 21 generates a read/write signal to transfer all but the least significant bit of the data from data sub-section NMD5 to data sub-section NRD5, i.e., the enable bit, (indicated by box 206) via data bus interconnect 32. Thus the enable bit is not transmitted and remains a zero (0).

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. Because all the bits stored in data sub-section NMD5 are zero, the motor driver circuit 10 returns to the idle state indicated by box 202.

MCU 14 generates another trigger signal to write the checksum value calculated in MCU 14 (e.g., 55 in hex) to checksum storage register 22C. More particularly, the trigger signal is a register write signal that writes the checksum value to transfer register 22E via serial peripheral interface 17. In response to the data being written to transfer register 22E, memory controller 21 generates a read/write signal that copies the checksum value from transfer register 22E to data checksum register 22C (indicated by box 204). In response to the checksum value being written into checksum register 22C, memory controller 21 generates a read/write signal to transfer the checksum value from checksum storage section 20C to checksum register 22C, (indicated by box 206) via data bus interconnect 34.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. Because all the bits stored in data sub-section NMD5 are zero, the motor driver circuit 10 returns to the idle state indicated by box 202.

Memory controller 21 generates a read/write signal to transfer all of the data from data sub-section NMD5 to data sub-section NRD5. In this case, the enable bit is a one, i.e., the enable bit, (indicated by box 206) via data bus interconnect 32.

Check function circuit 24 performs a checksum seed value calculation using the data stored in the k-bit data sub-sections RRD0, RRD1, RRD2, and RRD3 of register block 22, which is representative of the data in k-bit data sub-sections RMD0, RMD1, RMD2, and RMD3 of memory device 20 to calculate a checksum seed value.

Cyclic redundancy check circuit 54 sequentially uses the data values stored in restricted data sub-sections 22A and 22B, the data value in checksum storage register 22C, and intermediate values to calculate updated intermediate values for each of the data storage locations in register block 22 and to generate a checksum seed value and a verification value.

As discussed above, the least significant bit of the data in data sub-section NMD5 serves as an enable bit. Because the least significant bit stored in data sub-section NMD5 is one, motor driver circuit 10 determines whether the cyclic redundancy check circuit calculation indicates whether an error has occurred. Motor driver circuit 10 compares a predetermined value with the intermediate value calculated by the cyclic redundancy check circuit 54 and stored in the location identified by reference character 87. The value stored in the location identified by reference character 87 may be referred to as a verification value. In accordance with this embodiment, the predetermined value is 00 in hexadecimal and the intermediate value in the storage location identified by reference character 87 is 00 in hexadecimal. Thus, the values match. In accordance with an embodiment, comparator 61 shown in FIG. 2 outputs a logic zero value. Because the values match, motor driver circuit 10 enters the idle state indicated by reference character 202.

If the values do not match, motor driver circuit 10 generates an error signal that is transmitted from indicator device 29. In accordance with embodiments in which indicator device 29 is an LED, light may be emitted. In accordance with embodiments in which indicator device 29 is a buzzer or horn, sound may be emitted. In addition, motor driver circuit 10 may generate a signal that stops motor 12.

For the sake of completeness, FIG. 8 illustrates a case in which the predetermined value and the intermediate value calculated by the cyclic redundancy check circuit 54 and associated the location identified by reference character 87 do not match. The predetermined value is 00 in hexadecimal and the intermediate value in the storage location identified by reference character 87 is 9B in hexadecimal, thus the values do not match. This results from an error in the location identified by reference character 96. In this example, the value at the location identified by reference character is 7B, but it should be 77 (as shown in FIG. 7). Thus, a data error has occurred.

Flow diagram 200 of FIG. 6 further illustrates that periodically motor driver circuit 10 performs data integrity checks during motor rotation. During these checks, the motor driver circuit 10 transitions from the idle state identified by box 202 to the checksum calculation along the path indicated by reference character 250. Thus, motor driver circuit 10 performs the steps described above with reference to box 208. If the checksum function is disabled or the checksum result is 00 in hexadecimal, motor driver circuit 10 returns to the idle state. If the checksum function is enabled and the checksum result does not equal 00 in hexadecimal, motor driver circuit 10 continues with the steps described above with reference to boxes 210 and 212.

Figure 9:
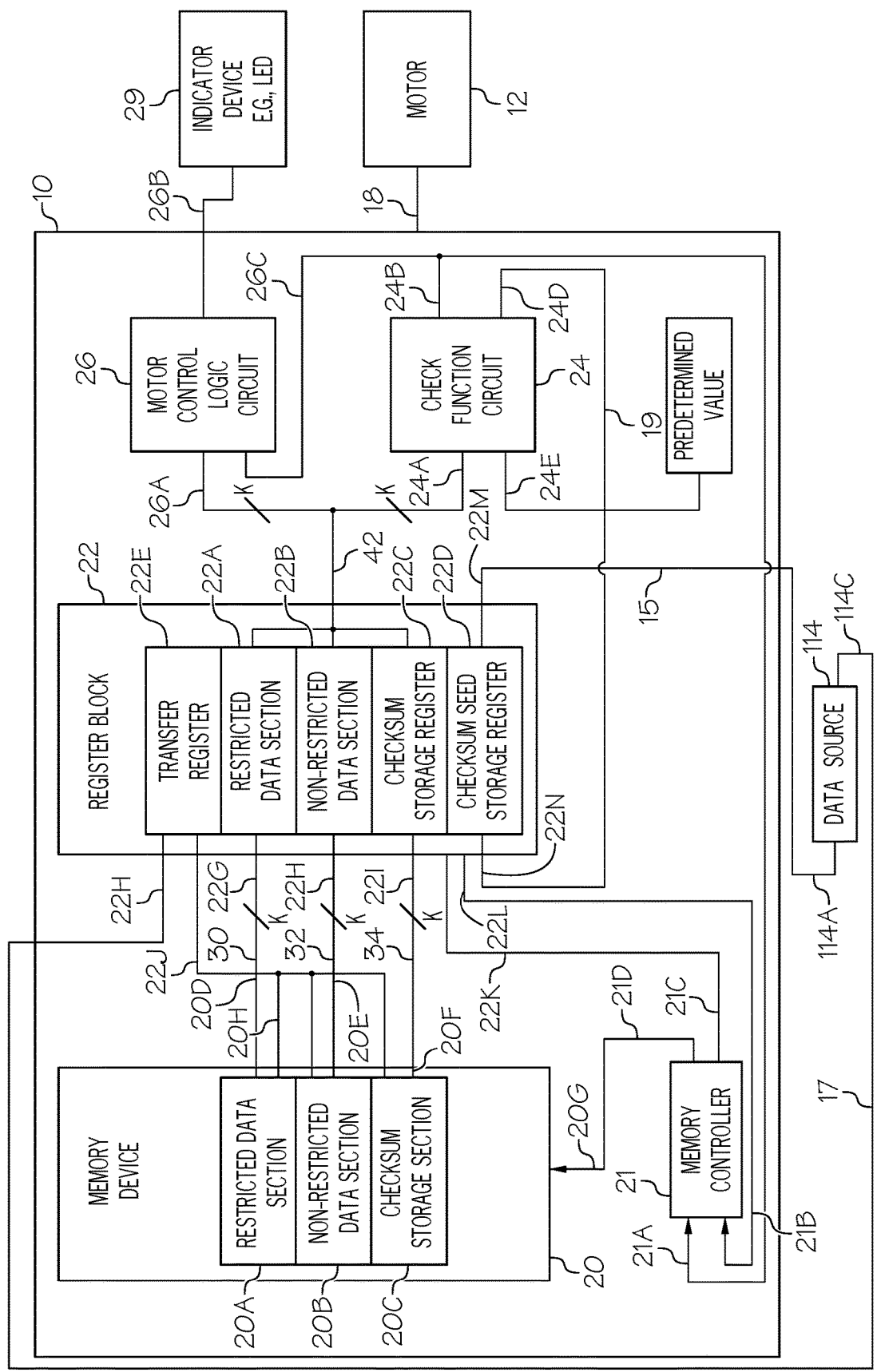
FIG. 9 is a block diagram of a motor driver circuit coupled to a motor in accordance with another embodiment of the present invention.

FIG. 9 is a block diagram of a motor driver circuit 10 configured for driving motor 12 in accordance with an embodiment of the present invention. What is shown in FIG. 9 is motor driver circuit 10 having an input coupled to a data source and an output coupled to motor 12. The configuration shown in FIG. 9 differs from that of FIG. 1 in that an MCU 14 of FIG. 1 is replaced with data structure 114. A data source 114 may be a memory device, a circuit containing, for example, a look-up table, etc. Data source 114 has an input 114C that is connected to register block 22 via serial peripheral interface 17 and an output 114A that is connected to checksum seed storage register 22D through serial peripheral interface 15.

By now it should be appreciated that methods and structures for verifying data integrity in a motor driver circuit have been provided. A motor driver circuit is provided that includes a memory device, a register block, a memory controller, a check function circuit 24, and a motor control logic circuit 26. Data is written to the memory device that includes trimming data for analog circuitry and data for a motor driver circuit that does not need to be set by, for example, a customer. This data is encoded in a checksum seed value. The checksum seed value and the data are used to verify the integrity of the data provided to the memory device from a customer. This technique allows a manufacturer to write data to the memory device without revealing the value of the data to a customer.

In accordance with embodiments of the present invention, data is copied from a one-time programmable memory to a register block and a checksum calculation is automatically performed at startup of a motor driver circuit. A checksum seed value is determined during the time that the checksum value is being calculated. The checksum seed value represents the contents of memory locations within the motor driver circuit. In response to an incorrect checksum calculation, a circuit such as, for example, a microcontroller unit is notified of the error. Optionally a control signal may be generated that starts the operation of the motor. The motor control circuit can be configured to start the checksum calculation of a register with commands from the microcontroller unit.

Cyclic redundancy check circuit 54 may use, for example, a polynomial such as $x^8+x^6+x^3+x^2+1$.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for verifying data in a memory device having a first restricted data section, a first non-restricted data section, and a checksum storage section, comprising:
   providing a register block having a first restricted data section, a first non-restricted data section, a first checksum storage register, and a first checksum seed storage register;
   copying the data into the register block, wherein the data in the first restricted data section of the memory device is copied to the first restricted data section of the register block, the data in the first non-restricted data section of the memory device is copied to the first non-restricted data section of the register block, and the data in the first checksum storage section of the memory device is copied to the first checksum storage register of the register block;

determining a checksum seed value from the data copied to the first restricted data section of the register block and a checksum value from the data copied into the register block;

determining a verification value using the checksum seed value and the checksum value; and using the verification value to verify integrity of the data in the memory device.

2. The method of claim 1, wherein determining the verification value includes using an error detecting technique to generate the verification value.

3. The method of claim 2, wherein using the error detecting technique comprises using cyclic redundancy check technique.

4. The method of claim 1, wherein determining the verification value includes using a look-up table to generate the verification value.

5. The method of claim 1, wherein using the verification value to verify integrity of the data in the first restricted data section of the memory device includes:

comparing the verification value with a predetermined value; and generating a verification signal in response to the verification value being equal to the predetermined value.

6. The method of claim 5, wherein the predetermined value is zero.

7. The method of claim 5, further including generating an error signal in response to the verification value and the predetermined value being unequal.

8. The method of claim 1, wherein determining the checksum seed value and the checksum value from the data copied into the register block includes sequentially determining intermediate values using a cyclic redundancy check technique.

9. The method of claim 8, further including using one of the intermediate values as the checksum seed value.

10. The method of claim 9, wherein determining the checksum seed value from the data copied to the first restricted data section of the register block and the checksum value from the data copied into the register block comprises:

using an initial intermediate value, a first data value copied to the register block, and a cyclic redundancy check technique to determine a first calculated intermediate value;

using the first calculated intermediate value, a second data value copied to the register block, and the cyclic redundancy check technique to determine a second calculated intermediate value;

using the second calculated intermediate value, a third data value copied to the register block, and the cyclic redundancy check technique to determine a third calculated intermediate value; and using the third calculated intermediate value, a fourth data value copied to the register block, and the cyclic redundancy check technique to determine a fourth calculated intermediate value.

11. The method of claim 9, further including using a least significant bit of one data value of the copied to the register block as an enable bit.

12. The method of claim 11 further including in response to the enable bit being enabled and the verification value indicating an error in the data:

re-copying the data into the register block, wherein the data in the first restricted data section of the memory device is copied to the first restricted data section of the register block, the data in the first non-restricted data section of the memory device is copied to the first non-restricted data section of the register block, and the data in the first checksum storage section of the memory device is copied to the first checksum storage register of the register block;

re-determining a checksum seed value and a checksum value from the data that was re-copied into the register block;

re-determining a verification value using the checksum seed value and the checksum value; and using the verification value that was re-determined to verify integrity of the data in the memory device.

13. A data integrity verification method, comprising:

providing a register block having a first restricted data section, a first non-restricted data section, a checksum storage section, and a checksum seed storage register;

copying data from a memory device to the first restricted data section and to the first non-restricted data section of a register block;

sequentially calculating intermediate values using the data copied to the first restricted data section, the data copied to the first non-restricted data section, and an initial intermediate value, wherein a first calculated intermediate value serves as a checksum seed value, a second calculated intermediate value serves as a checksum value, and a third calculated intermediate value serves as a verification value; and using the verification value to verify integrity of the data copied to the register block.

14. The data integrity verification method of claim 13, further including calculating the first checksum seed value using a cyclic redundancy check technique.

15. The integrity verification method of claim 13, wherein copying the data to the first restricted data section and to the first non-restricted data section further includes reading data from one of a microcontroller unit or a data storage structure and writing the data that has been read to the first restricted data section and to the first non-restricted section of the register block.

16. The data integrity verification method of claim 13, wherein using the verification value to verify integrity of the data copied to the register block includes comparing the verification value with a predetermined value, and wherein the data integrity is confirmed in response to the verification value being equal to the predetermined value.

17. The data integrity verification method of claim 13, wherein the first calculated intermediate value is calculated from a data value of a data storage register that is the last data storage register of the first restricted data section.

18. The data integrity verification method of 13, further including using a least significant bit of a data value of a last data storage register of the non-restricted data section of the memory device as an enable bit, and further including in response to the enable bit indicating an enable signal:

re-copying the data to the first restricted data section and to the first non-restricted data section of the register block;

sequentially calculating intermediate values using the data re-copied to the first restricted data section, the data re-copied to the first non-restricted data section, and an initial intermediate value, wherein a first calculated intermediate value serves as a checksum seed value, a second calculated intermediate value serves as a checksum value, and a third calculated intermediate value serves as a verification value; and comparing the verification value with a predetermined value, and wherein the data integrity is confirmed in response to the verification value being equal to the predetermined value.

19. A motor driver circuit, comprising:
a memory device configured to have a reserved data section, a non-reserved data section, and a checksum storage section;
a register block coupled to the memory device, the register block including a first reserved data section, a first non-reserved data section, a checksum seed storage register; and
a check function circuit coupled to the register block.

20. The motor driver circuit of claim 19, wherein the check function circuit comprises:
a multiplexer having a plurality of input terminals and an output terminal;
a byte counter coupled to a first input of the plurality of inputs of the multiplexer;
a cyclic redundancy check module having a first input, a second input, and an output, the first input of the cyclic redundancy check module coupled to the output of the multiplexer;
an intermediate value register block having an input and an output, the input of the intermediate value register block coupled to the output of the cyclic redundancy check module and the output of the intermediate value register block coupled to the second input of the multiplexer; and
a comparator having an input coupled to the output of the cyclic redundancy check module.

* * * * *